US000001353H

United States Statutory Invention Registration [19]

[11] Reg. Number: H1353

Malejko et al.

[43] Published: Sep. 6, 1994

[54] VELOCITY ENHANCING PROJECTILE SABOT

[75] Inventors: Gregory Malejko, Hackettstown; John C. Grau, Sussex, both of N.J.

[73] Assignee: The United States of America as represented by the Secretary of the Army, Washington, D.C.

[21] Appl. No.: 200,801

[22] Filed: Feb. 18, 1994

Related U.S. Application Data

[63] Continuation of Ser. No. 96,496, Jul. 26, 1993, abandoned.

[51] Int. Cl.[5] ..... F42B 5/00; F42B 14/06

[52] U.S. Cl. ..... 102/439; 102/431; 102/521

*Primary Examiner*—Harold J. Tudor

*Attorney, Agent, or Firm*—Anthony T. Lane; Edward Goldberg; Michael Sachs

[57] ABSTRACT

A cartridge for a kinetic energy projectile, where the projectile has a diameter of less than a gun bore diameter and the projectile is saboted in order to support and guide the projectile along the gun bore. The sabot 42 has a closing disk 48 which radially extends from the projectile or penetrator 41 to the internal diameter of the gun bore. The closing disk is positioned on the penetrator at a location spaced from an open end 14 of a cartridge case 49. A shell 13 extends from the closing disk to the open end 14 of the cartridge case. The shell 13 is positioned adjacent the internal diameter of the gun bore, and the shell 13 along with the sabot defines a sabot volume. The sabot volume along with the volume defined by the cartridge case is filled with propellant.

11 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

VELOCITY ENHANCING PROJECTILE SABOT

GOVERNMENTAL INTEREST

The invention described herein may be made, used or licensed by or for the U.S. Government without payment of royalties to us.

This application is a continuation of application Ser. No. 08/096,496, filed Jul. 26, 1993, now abandoned.

FIELD OF THE INVENTION

The present invention relates to a cartridge for propelling a projectile along a gun bore, and in particular to a cartridge where the projectile is guided in the gun bore by a sabot.

BACKGROUND OF THE INVENTION

The present invention is concerned with Kinetic Energy (KE) projectiles. These projectiles provide armor penetration by using the kinetic energy of the projectile.

Many current projectiles are subcaliber and require sabots to guide them down the gun bore, obturate the propellant gases and provide structural support.

FIG. 1 shows a conventional cartridge. The projectile consists of a penetrator 1. A cartridge case 9 surrounds a portion of the penetrator 1 known as the cartridge portion. A bore portion of the penetrator 1 extends out of the cartridge case 9. A sabot 2 is attached to the penetrator 1 via buttress grooves (such as can be seen in FIG. 2 as 43). The sabot has a bore-riding surface 4 which guides the sabot along the bore as the projectile travels down the gun tube. The inside of the cartridge case 9 is filled with gun propellant 10, which combusts and forces the sabot 2 and the penetrator 1 along the gun bore. An obturating band 5 seals the propellant gases behind the sabot/penetrator assembly. Ramps (such as can be seen in FIG. 2 as 46) support the penetrator during acceleration, and a tip ring (such as can be seen in FIG. 2 as 47) and scoop 8 aid in the sabot discard process after the sabot/penetrator assembly exits the gun barrel.

From a performance point of view, sabots are parasitic. A sabot requires a considerable amount of the energy from the propellant, in order to accelerate the sabot along the gun bore.

SUMMARY AND THE OBJECTS OF THE INVENTION

As described above, kinetic energy projectiles achieve their armor piercing abilities by providing a large amount of kinetic energy with a small frontal area at the target. One way of increasing the armor piercing abilities of a projectile is to decrease its frontal area. If the frontal area is made very small, the projectile will require a sabot in order to obturate the propellant gases, guide the projectile along the bore and to provide the structural support. Very often a gun or firearm will be required to fire several different types of projectiles. Therefore the size of the cartridge case and the bore must be a compromise between the needs of all the different types of projectiles. Other types of projectiles could be explosive and fragmentary.

Another way to increase the armor piercing ability of a projectile is to increase its kinetic energy. Since kinetic energy is a function of the velocity squared, any increase in velocity will result in an even larger increase in kinetic energy. Therefore the combination of small frontal area and high velocity creates a kinetic energy projectile which has a large amount of armor piercing ability. However, the use of a sabot, in order to have a small frontal area, consumes some of the propulsion energy from the propellant. All the energy from the propellant does not increase the velocity of the projectile.

It is an object of the present invention to provide a cartridge of predetermined size, for use of a firearm of predetermined bore size, and which can propel a kinetic energy projectile with larger armor piercing abilities then presently available.

It is also an object of the present invention to provide a kinetic energy projectile which has a velocity which is larger than presently available. This increase in velocity has several other advantages such as reducing the flight time of the projectile. This reduction in flight time reduces the gravity drop of the projectile, allowing for flatter trajectories and therefore reduces ranging error. Also minimizing the time of flight, reduces windage error and lead errors for moving targets.

These objects are obtained by having a very small frontal area of the projectile, and by providing an additional volume for the propellant, while still maintaining the same size cartridge case and gun bore of a conventional cartridge.

The projectile of the present invention is saboted. At a tip end of the sabot, substantially opposite the cartridge, there is a closing disk which extends radially in all directions from the projectile or penetrator to the inside diameter of the gun bore. A shell of the sabot is positioned adjacent the inside diameter of the gun bore and extends from the closing disk to an open end of the cartridge case. This shell and the sabot define a sabot volume that can be filled with propellant means, in addition to the volume of the cartridge case which is also filled with propellant means.

The additional propellant contained inside the sabot volume provides additional energy for accelerating the sabot and penetrator, and offsets, if not over compensates, for the energy consumed by the sabot during acceleration.

An obturating band means is positioned on an outside diameter of the closing disk and seals the closing disk to the gun bore.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENT

Figure 1:
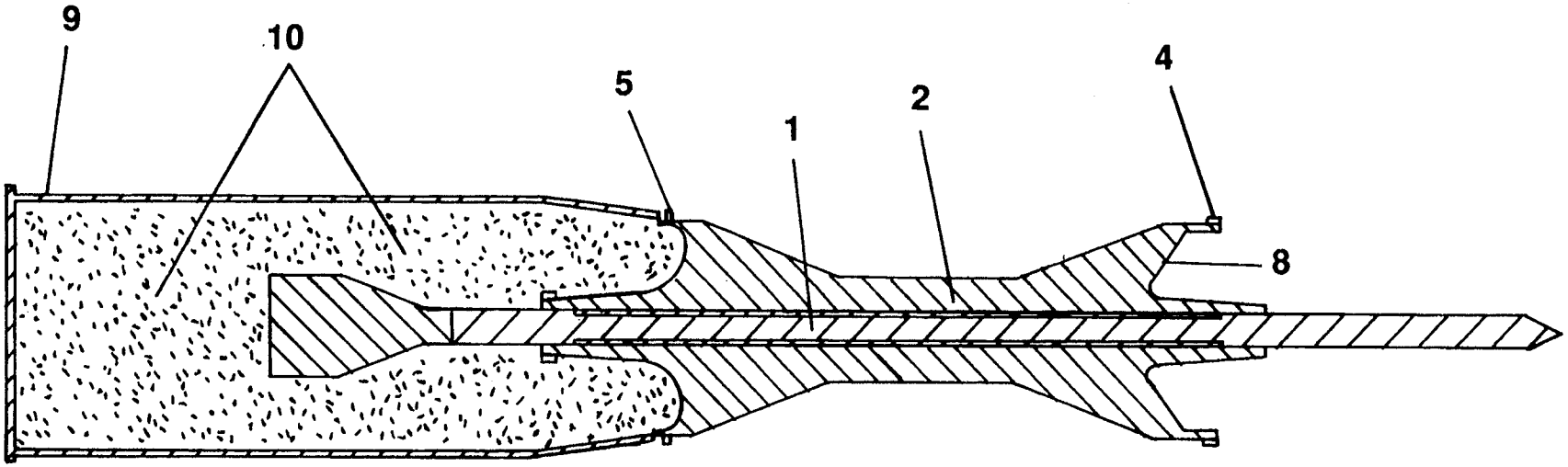
FIG. 1 is a longitudinal cross sectional view of a conventional cartridge.
Figure 2:
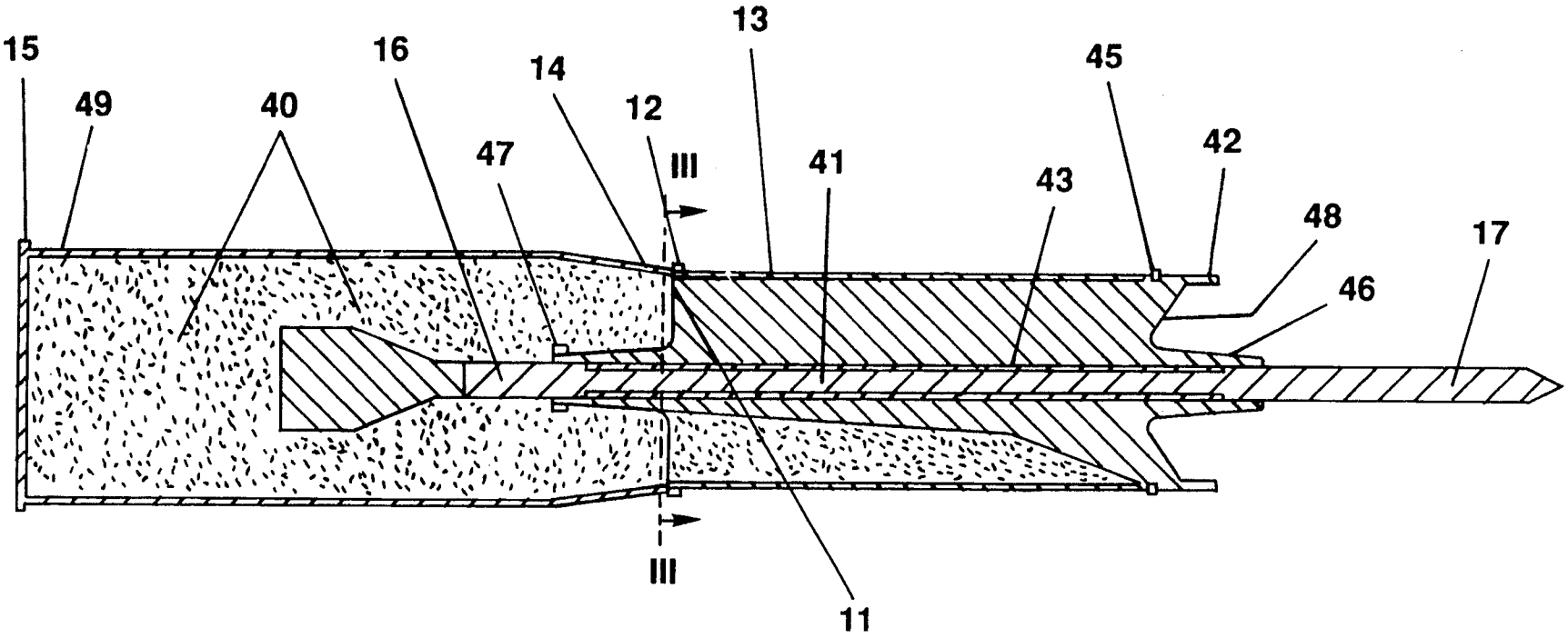
FIG. 2 is a longitudinal cross sectional view of a cartridge according to the present invention.

A prior art example is shown in FIG. 1 representing a background device for the invention. Generally in that example, item 1 is a penetrator, item 2 is a sabot, items 4 and 5 are obturation band means, item 8 is a scoop means on the sabot, item 9 is the cartridge case, and item 10 represents propellant. The present invention has a cartridge case 49 which has a size and shape to allow it to fit into firearms using a conventional cartridge. The cartridge has an open end 14 and a base end 15. A penetrator 41 has a base portion 16 positioned inside the cartridge case. The penetrator also has a bore portion 17 extending out of the open end 14 of the cartridge case. A sabot 42 is attached to the penetrator 1. This sabot is positioned mostly adjacent the bore portion 17 of the penetrator 1, but can also extend into the cartridge case and attached to the cartridge portion 16 of the penetrator. An outer diameter of the penetrator being much smaller than an internal diameter of the bore of the firearm. As explained above, the diameter of the penetrator is made as small as possible in order to have a small frontal area. Since the diameter of the penetrator is so small, the sabot is required to guide and support the penetrator 1 as it moves along the bore of a firearm that is also to be used with different types of projectiles.

Figure 3:
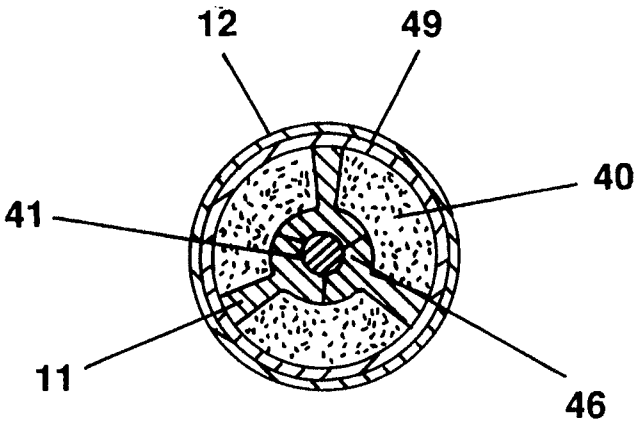
FIG. 3 is an axial cross sectional view of the present invention taken along lines III—III of FIG. 2.

The sabot includes a closing disk 48 which radially extends in all directions from the penetrator to the inside diameter of the gun bore. The sabot also includes a plurality of longitudinal ribs 11 (see FIG. 3) which extend radially outward from the penetrator. In the preferred embodiment, the plurality of longitudinal ribs also extend axially from the closing disk to the opening end 14 of the cartridge case. A cartridge ring means 12 connects the sabot to the cartridge case during handling and transportation of the cartridge. This cartridge ring means 12 also allows the sabot to separate from the cartridge case when the projectile is fired along the gun bore. A cylindrical shaped shell 13 is wrapped around the radial ends of the longitudinal ribs 11. The shell 13 and the sabot thus define a sabot volume extending from the closing disk to the opening end 14. The cartridge case likewise defines a cartridge volume extending from the base end 15 to the opening end 14 of the cartridge case.

A propellant means 40 is positioned in the cartridge volume and the sabot volume. This propellant means propels the sabot and the penetrator along the gun bore when ignited. The sabot includes an obturation band means 45 between an outside diameter of the closing disk and the inside of the gun bore. The obturation band means provides a sealing connection between the first end of the sabot and the inside of the gun bore. The obturation band means prevents gases of the propellant means for escaping past the sabot. In the preferred embodiment, the obturating band means initially has a diameter less than the internal diameter of the bore, in order for the cartridge to be easily loaded into the firearm or gun. The obturating band means then expands during the propelling of the sabot along the gun bore.

In the preferred embodiment, the sabot is divided into three separate sections, with each section having a longitudinal rib. These ribs extends substantially continuously from the closing disk to the opening end 14 in order to provide the necessary stiffness. However it is possible within the concept of the present invention for there to be openings in the longitudinal ribs. Also the cartridge ring means can have a bore-riding surface to guide the sabot and the penetrator along the gun bore. The plurality of longitudinal ribs are preferably evenly angularly spaced along the circumference of the penetrator.

The closing disk can define a scoop means to aid in the sabot discharge process after the sabot/penetrator assembly exits the gun bore.

The shell 13 can be made of a combustible material and consumed during the firing of the cartridge. It is also possible for the shell to be rigidly attached to the sabot and to travel along the gun bore with the sabot and the penetrator. Another possibility would be to form a portion of the shell 13 and the sabot from an integral piece of material.

In another embodiment, the shell is positioned between the plurality of longitudinal ribs and can include a plurality of individual shell pieces. Each shell piece is positioned between different longitudinal ribs of the plurality of longitudinal ribs.

The present invention therefore provides an additional volume for a propellant means and therefore is able to provide more kinetic energy to the penetrator and to overcome the energy consumed by the sabot during acceleration.

While specific embodiments of the invention have been shown and described in detail to illustrate the application of the principles of the invention, it will be understood that the invention may be embodied otherwise without departing from such principles.

What is claimed is:

1. A cartridge for propelling a saboted projectile from a gun bore, the cartridge comprising:

a cartridge case having a base end and an opened end, said cartridge case defining a cartridge volume;

a penetrator used as the projectile, said penetrator having a cartridge portion positioned in said cartridge case and a bore portion extending out of said opened end of said cartridge case, a diameter of said bore portion of said penetrator being less than an inside diameter of the gun bore;

a sabot attached to said penetrator and positioned between said penetrator and the gun bore, a first end of said sabot being positioned adjacent said bore portion of said penetrator and having a closing disk radially extending in all directions to the inside diameter of the gun bore, said sabot including obturation band means for providing a sealing connection between said first end of said sabot and the inside of the gun bore, said sabot also including a plurality of longitudinal ribs radially extending from said penetrator to the inside diameter of the gun bore;

a shell positioned adjacent the inside diameter of the gun bore and axially extending from said open end of said cartridge to said closing disk, said shell and said sabot defining a sabot volume;

propellant means positioned in said cartridge volume and said sabot volume, and for propelling said sabot and said penetrator along said gun bore.

2. A cartridge in accordance with claim 1, wherein: said plurality of longitudinal ribs are substantially evenly spaced along a circumference of said penetrator.

3. A cartridge in accordance with claim 1, wherein: said plurality of longitudinal ribs contains three (3) longitudinal ribs.

4. A cartridge in accordance with claim 1, wherein: said closing disk defines a scoop means for separating said sabot from said penetrator when said sabot and said penetrator exit the gun bore.

5. A cartridge in accordance with claim 1, wherein:

said propellant means provides said propelling through combustion;

said shell is combustible.

6. A cartridge in accordance with claim 1, wherein:

said shell is rigidly attached to said closing disk, and said shell and said closing disk travel along the gun bore together.

7. A cartridge in accordance with claim 1, further comprising:

a cartridge ring means for connecting said sabot to said cartridge case during loading of the cartridge and for separating said sabot from said cartridge case during propelling of the sabot along the gun bore.

8. A cartridge in accordance with claim 7, wherein:

said cartridge ring means connects said opened end of said cartridge to said plurality of longitudinal ribs.

9. A cartridge in accordance with claim 7, wherein:

said cartridge ring means has a bore-riding surface.

10. A cartridge in accordance with claim 1, wherein:

said obturation band means has an external diameter less than the internal diameter of the gun bore, said obturation band means also expands during propelling of said sabot along the gun bore.

11. A cartridge in accordance with claim 1, wherein:

said plurality of longitudinal ribs extend axially from said closing disk to said opened end of said cartridge case.

* * * * *